United States Patent
Matsuura et al.

(10) Patent No.: US 8,089,826 B2
(45) Date of Patent: Jan. 3, 2012

(54) ULTRASONIC DEVICE FOR DETECTING DIRECTION TO OBJECT

(75) Inventors: Mitsuyasu Matsuura, Chiryu (JP); Toshiki Isogai, Nagoya (JP); Ayako Okamoto, Nishio (JP); Hiromi Ariyoshi, Kariya (JP); Yasuyuki Okuda, Aichi-gun (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 343 days.

(21) Appl. No.: 12/458,924

(22) Filed: Jul. 28, 2009

(65) Prior Publication Data

US 2010/0024557 A1 Feb. 4, 2010

(30) Foreign Application Priority Data

Aug. 1, 2008 (JP) .................................. 2008-199601

(51) Int. Cl.
*G01N 29/00* (2006.01)
(52) U.S. Cl. ........................................................ 367/99
(58) Field of Classification Search .................... 367/99, 367/90
See application file for complete search history.

(56) References Cited

U.S. PATENT DOCUMENTS

| | | | |
|---|---|---|---|
| 2006/0196272 A1 | 9/2006 | Sugiura et al. | |
| 2010/0024557 A1* | 2/2010 | Matsuura et al. | 73/627 |

FOREIGN PATENT DOCUMENTS

| | | |
|---|---|---|
| JP | A-S59-151076 | 8/1984 |
| JP | A-H09-178836 | 7/1997 |
| JP | A-H10-332881 | 12/1998 |
| JP | A-2001-108745 | 4/2001 |
| JP | A-2002-131417 | 5/2002 |
| JP | A-2004-12362 | 1/2004 |
| JP | A-2006-153588 | 6/2006 |
| JP | A-2007-93480 | 4/2007 |
| JP | A-2007-304118 | 11/2007 |

OTHER PUBLICATIONS

Notice of Reason for Refusal mailed Apr. 20, 2010 issued from the Japan Patent Office in the corresponding patent application No. 2008-199601 (and English translation).

* cited by examiner

*Primary Examiner* — Daniel Pihulic
(74) *Attorney, Agent, or Firm* — Posz Law Group, PLC

(57) ABSTRACT

A ultrasonic device detecting a direction to an object includes: a transmitting element of a ultrasonic wave; first and second receiving elements; a diffraction wave phase detector; an initial phase memory for an initial phase of a diffraction wave; a sound speed detector; a phase correction amount calculator calculating a phase shift caused by a sound speed change and calculating a phase correction amount based on the phase of the diffraction wave, the initial phase and the phase shift; a phase correction element correcting a phase of the reflection wave based on the phase correction amount; and a direction detector for detecting the direction to the object based on a difference between corrected phases of the reflection wave received by the first and second receiving elements, a distance between the first and second receiving elements, and a wavelength of the transmission ultrasonic wave corresponding to a sound speed.

6 Claims, 5 Drawing Sheets

US 8,089,826 B2

ULTRASONIC DEVICE FOR DETECTING DIRECTION TO OBJECT

CROSS REFERENCE TO RELATED APPLICATION

This application is based on Japanese Patent Application No. 2008-199601 filed on Aug. 1, 2008, the disclosure of which is incorporated herein by reference.

FIELD OF THE INVENTION

The present invention relates to an ultrasonic device for detecting a direction to an object.

BACKGROUND OF THE INVENTION

An ultrasonic device for detecting a direction to an object is proposed. The device transmits an ultrasonic wave pulse as a transmitting wave. The transmitting wave is reflected on the object. The reflected wave is received by multiple receiving elements, which are arranged in an array. A phase difference between a phase of the reflected wave received by one of the receiving elements and a phase of the reflected wave received by another one of the receiving elements, a distance between the one and the other one of the receiving elements, and a wavelength of the transmitting wave are used for detecting the direction of the object.

When the ultrasonic wave is used, it is necessary to expose the transmitting element and the receiving element to an outside of the device. When the direction of the object is detected based on the phase difference (i.e., the phase difference between two receiving elements), a phase of each element shifts if temperature characteristics of a receiving side of the device may be varied or a foreign particle such as a water drop or a dust is attached to the receiving element. Thus, detection accuracy of the device is reduced because of the phase shift.

JP-A-2006-242650 corresponding to US 2006/0196272 teaches that operation failure is detected by monitoring the reflected wave received by the receiving elements. JP-A-2007-93480 teaches that an electric wave is used as the transmitting wave, the reflected wave from a radome arranged in front of the device is received, a phase difference caused by variation of temperature characteristics of the receiving side of the device is stored as an initial phase difference, and the actual phase difference is calculated based on the detected phase difference and the initial phase difference.

However, when the receiving elements are exposed to the outside of the device, the technique disclosed in the above prior art does not completely settle the matter of reduction of the detection accuracy for detecting the direction of the object, the reduction being caused by the variation of the temperature characteristics of the receiving side of the device or the foreign particle attached to the receiving elements.

SUMMARY OF THE INVENTION

In view of the above-described problem, it is an object of the present disclosure to provide an ultrasonic device for detecting a direction of an object. The device has sufficient detection accuracy even when a receiving element in the device is exposed to an outside of the device.

According to an aspect of the present disclosure, a ultrasonic device for detecting a direction to an object includes: a transmitting element for transmitting a transmission ultrasonic wave; first and second receiving elements for receiving a reflection wave, which is reflected on the object, wherein the first and second receiving elements are arranged in an array manner; a diffraction wave phase detector for detecting a phase of a diffraction wave penetrating into each of the first and second receiving elements, wherein the diffraction wave is generated in such a manner that a part of the transmission wave is diffracted and penetrates into the first and second receiving elements; an initial phase memory for storing the phase of the diffraction wave as an initial phase under a predetermined sound speed; a sound speed detector for detecting a sound speed; a phase correction amount calculator for calculating a phase shift of the diffraction wave received by each of the first and second receiving elements, wherein the phase shift is caused by a sound speed change, and for calculating a phase correction amount in each of the first and second receiving elements based on the phase of the diffraction wave, the initial phase of the diffraction wave and the phase shift of the diffraction wave; a phase correction element for correcting a phase of the reflection wave received by each of the first and second receiving elements based on the phase correction amount; and a direction detector for detecting the direction to the object based on a difference between a corrected phase of the reflection wave received by the first receiving element and a corrected phase of the reflection wave received by the second receiving element, a distance between the first and second receiving elements, and a wavelength of the transmission ultrasonic wave corresponding to the sound speed.

Since a phase relationship between the diffraction wave and the reflection wave is maintained, the phase of the reflection wave can be corrected in view of the phase correction amount, which is calculated based on the phase shift of the diffraction wave. Thus, the phase shift of the reflection wave is corrected. Accordingly, even if a foreign matter is attached to the receiving element, or temperature characteristics of a receiving side are varied, the direction to the object is detected with high accuracy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
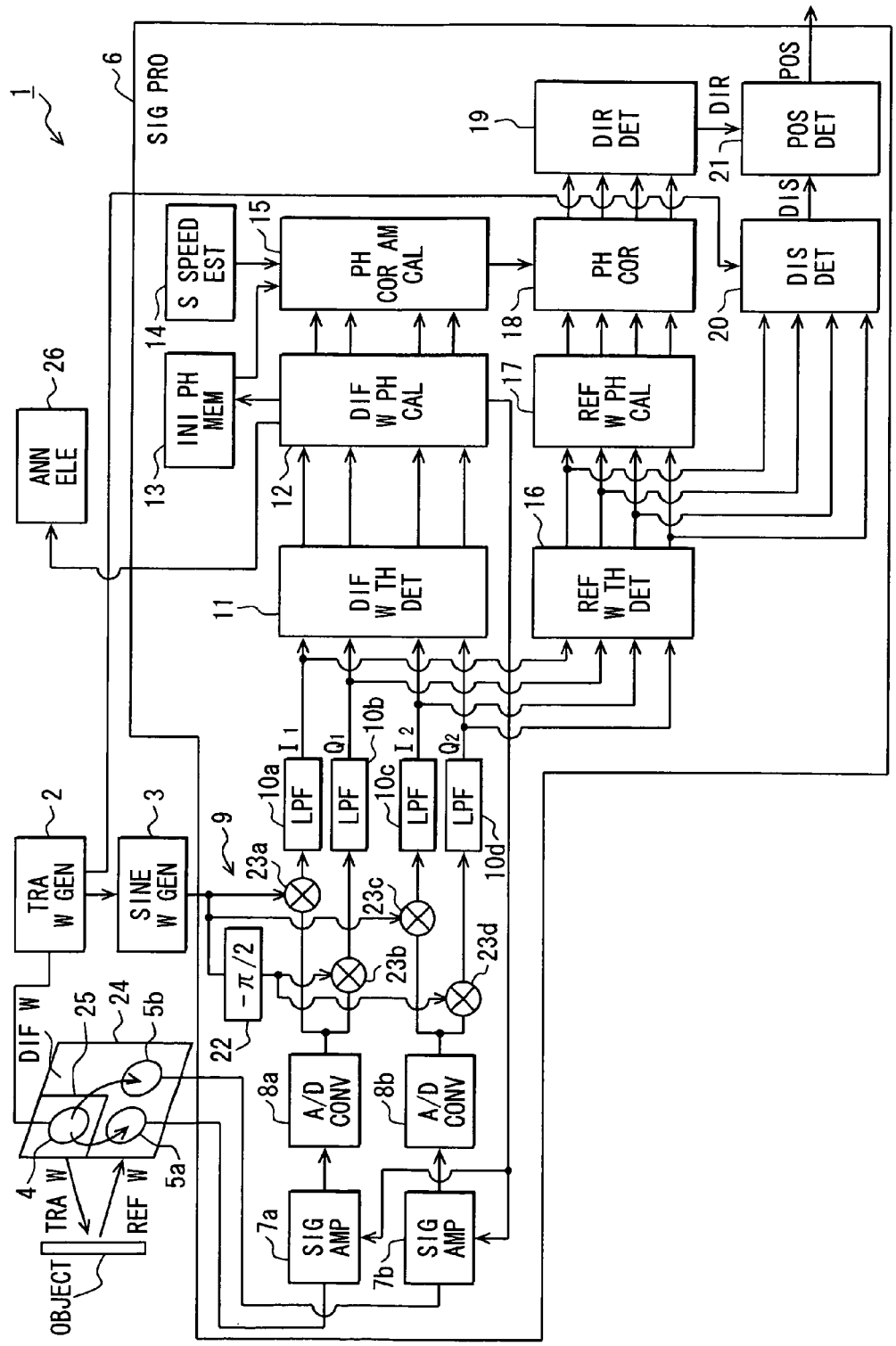
FIG. 1 is a diagram showing a ultrasonic device for detecting a direction of an object according to an example embodiment.

An ultrasonic device for detecting a direction of an object will be explained as follows. The ultrasonic device is suitably used for an in-vehicle ultrasonic sonar for detecting an obstacle around a vehicle. FIG. 1 shows the ultrasonic device 1 for detecting a position of the object. The device 1 includes a transmitting wave generator 2, a sine wave generation element 3, a transmitting microphone 4 as a transmitting element, a receiving microphone 5a, 5b as a receiving element, and a signal processor 6.

The signal processor 6 includes a signal amplifier 7a, 7b, as a signal amplifying element, an A/D converter 8a, 8b, an orthogonal demodulator 9, LPFs (i.e., low pass filters) 10a-10d, a diffraction wave threshold determination element 11, a diffraction wave phase calculator 12 as a calculating element for calculating a phase of a diffraction wave, an initial phase memory 13 as a storing element for memorizing an initial phase, a sound speed estimating element 14 as a sound speed estimator, a phase correction amount calculator 15 as a calculating element for an amount of phase correction, a reflected wave threshold determination element 16, a reflected wave phase detector 17, a phase corrector 18 as a phase correcting element, a direction detector 19 as a detection element for a direction of the object, a distance detector 20 and a position detector 21.

The transmitting wave generator 2 outputs a ultrasonic wave as a transmitting wave to the sine wave generator 3 and the transmitting microphone 4. The ultrasonic wave has a predetermined angular frequency and a predetermined pulse number such as ten pulses. When the sine wave generator 3 receives the transmitting wave from the transmitting wave generator 2, the sine wave generator 3 generates a sine wave having an angular frequency synchronized with the transmitting wave. Further, the sine wave generator 3 outputs the generated sine wave to the orthogonal demodulator 9, which includes a phase converter 22 and multipliers 23a-23d. In this case, the sine wave generator 3 outputs the generated sine wave to the multipliers 23a, 23c without converting the phase of the sine wave. Further, the generated sine wave is output to the phase converter 22 so that the phase of the generated sine wave is converted, i.e., the phase of the sine wave is shifted by pai/2, and then, the phase-converted sine wave is output to the multipliers 23b, 23d.

The transmitting microphone 4 is provided by a resonance microphone having a Piezo electric element and a cover. The Piezo electric element is covered with the cover. The Piezo electric element is driven so that the cover resonates. The transmitting wave from the transmitting wave generator 2 is supplied to the Piezo electric element so that the cover resonates with operation of the Piezo electric element. Thus, the transmitting wave is output from the microphone 4. Here, the ultrasonic wave is easily diffracted, and thereby, a part of the transmitting wave output from the microphone 4 is diffracted, and directly penetrates into the receiving microphone 5a, 5b, so that a diffraction wave is generated.

The receiving microphone 5a, 5b is provided by a resonance microphone having a Piezo electric element and a cover. The Piezo electric element is covered with the cover. The Piezo electric element is driven so that the cover resonates. The transmitting wave reflects on the object so that a reflection wave is generated. When the receiving microphone 5a, 5b receives the diffraction wave and the reflection wave, the Piezo electric element outputs a receiving signal corresponding to a voltage generated in the element to the signal amplifier 7a, 7b. In this case, the transmitting microphone 4 and the receiving microphone 5a, 5b are arranged in the casing 24 approximately to each other. The microphones 4, 5a, 5b are fixed to the casing 24 by potting a periphery of each microphone 4, 5a, 5b with silicon rubber. When the transmitting microphone 4 transmits the transmitting wave, solid vibration may be generated. If the solid vibration is larger than the diffraction wave, the receiving microphone 5a, 5b cannot detect the diffraction wave. Accordingly, to prohibit the solid vibration from conducting to the receiving microphone 5a, 5b, a wall 25 is arranged between the transmitting microphone 4 and the receiving microphone 5a, 5b. A distance between the transmitting microphone 4 and the receiving microphone 5a, 5b is a half of a wavelength of the transmitting wave having a predetermined angular frequency, which is generated by the transmitting wave generator 2.

The diffraction wave phase calculator 12 inputs an amplification factor instruction signal into the signal amplifier 7a, 7b. Based on the amplification factor instruction signal, the signal amplifier 7a, 7b sets the amplification factor. When the receiving microphone 5a, 5b inputs the receiving signal into the signal amplifier 7a, 7b, the amplifier 7a, 7b amplifies the receiving signal according to the amplification factor, and then, the amplifier 7a, 7b outputs the amplified receiving signal to the A/D converter 8a, 8b. When the amplified receiving signal from the amplifier 7a, 7b is input in the converter 8a, 8b, the converter 8a, 8b samples the amplified receiving signal with a predetermined sampling frequency so that the amplified receiving signal is converted into a digital signal. Here, the sampling frequency is equal to or larger than a frequency of the transmitting signal, which is defined by a sampling theorem. In this embodiment, the sampling frequency is four times larger than the frequency of the transmitting signal. Further, the converter 8a, 8b outputs the digital signal as a digitized receiving signal to the multipliers 23a-23d.

When the digitized receiving signal from the converter 8a, 8b is input into the orthogonal demodulator 9, and the sine wave from the sine wave generation element 3 is input into the orthogonal demodulator 9, the multiplier 23a, 23c in the orthogonal demodulator 9 multiplies the digital receiving signal by the sine wave. When the digitized receiving signal from the converter 8a, 8b is input into the orthogonal demodulator 9, and the phase-converted sine wave from the sine wave generation element 3 via the phase converter 22 is input into the orthogonal demodulator 9, the multiplier 23b, 23d in the orthogonal demodulator 9 multiplies the digital receiving signal by the phase-converted sine wave. Thus, the digitized receiving signal is divided into an in-phase component (i.e., an I component) and an orthogonal component (i.e., a Q component), and then, the components are output to the LPF 10a-10d.

When the I component of the digitized receiving signal and the Q component of the digitized receiving signal from the orthogonal demodulator 9 are input into the LFP 10a-10d, a high frequency component of each of the I and Q components is removed. The I and Q components without the high frequency component in the digitized receiving signal is output to the diffraction wave threshold determination element 11 and the reflected wave threshold determination element 16.

When the I and Q components from the LPF 10a-10d are input into the diffraction wave threshold determination element 11, the diffraction wave threshold determination element 11 calculates an amplitude of the receiving signal based on the I and Q components as a complex signal. When the amplitude of the receiving signal is equal to or larger than a predetermined threshold level (i.e., a predetermined amplitude level), the diffraction wave threshold determination element 11 determines a receiving time of the diffraction wave that is received by the receiving microphone 5a, 5b based on a time at which the amplitude of the receiving signal exceeds the threshold level. The diffraction wave threshold determination element 11 outputs the receiving time of the diffraction wave to the diffraction wave phase calculator 12.

When the receiving time of the diffraction wave from the diffraction wave threshold determination element 11 is input into the diffraction wave phase calculator 12, the diffraction wave phase calculator 12 calculates a phase of the diffraction wave based on the receiving time of the diffraction wave. The diffraction wave threshold determination element 11 selectively outputs the phase of the diffraction wave to only one of the initial phase memory 13 and the phase correction amount calculator 15. In this case, the diffraction wave phase calculator 12 outputs the phase of the diffraction wave to the initial phase memory 13 before the ultrasonic device 1 for detecting the position of the object is shipped as a product. The diffraction wave phase calculator 12 outputs the phase of the diffraction wave to the phase correction amount calculator 15 after the ultrasonic device 1 for detecting the position of the object is shipped as a product. Further, the diffraction wave phase calculator 12 outputs the amplification factor instruction signal to the signal amplifier 7a, 7b so that the amplification factor is set in the signal amplifier 7a, 7b. Furthermore, the diffraction wave phase calculator 12 outputs an annunciation instruction signal to an annunciation element 26. Thus, the annunciation element 26 performs annunciation.

When the phase pf the diffraction wave from the diffraction wave phase calculator 12 is input into the initial phase memory 13, the initial phase memory 13 stores the phase pf the diffraction wave as an initial phase. The temperature detected by a temperature sensor (i.e., a temperature detecting element, and not shown) is input into the sound speed estimating element 14. The sound speed estimating element 14 calculates the sound speed based on the temperature. Further, the sound speed estimating element 14 outputs the calculated sound speed to the phase correction amount calculator 15. Specifically, the sound speed estimating element 14 calculates the sound speed according to the following formula.

$$C=331.5+0.61\times T.$$

Here, T represents the temperature (° C.), and C represents the sound speed (m/s).

The phase of the diffraction wave from the diffraction wave phase calculator 12 is input into the phase correction amount calculator 15. Further, the initial phase of the diffraction wave stored in the initial phase memory 13 is input into the phase correction amount calculator 15, and the sound speed from the sound speed estimating element 14 is input into the phase correction amount calculator 15. Based on the sound speed, the phase correction amount calculator 15 calculates a phase shift caused by the sound speed change. Further, the phase correction amount calculator 15 calculates a phase correction amount based on the phase of the diffraction wave input from the diffraction wave phase calculator 12, the initial phase of the diffraction wave input from the initial phase memory 13, and the phase shift. The phase correction amount calculator 15 outputs the phase correction amount to the phase corrector 18.

When the I component and the Q component of the receiving signal from the LPFs 10a-10d are input into the reflected wave threshold determination element 16, the reflected wave threshold determination element 16 calculates the amplitude of the receiving signal based on the complex signals, i.e., the I component and the Q component. When the calculated amplitude of the receiving signal is equal to or larger than a predetermined threshold (i.e., a predetermined amplitude level), the reflected wave threshold determination element 16 determines the time of receiving the reflected wave by using the receiving microphones 5a, 5b according to the time when the amplitude of the receiving signal exceeds the threshold. The reflected wave threshold determination element 16 outputs the determined time when the receiving microphones 5a, 5b receives the reflected wave to the reflected wave phase detector 17 and the distance detector 20. In this case, the threshold preliminary set in the reflected wave threshold determination element 16 is smaller than the threshold preliminary set in the diffraction wave threshold determination element 11.

When the time of receiving the reflected wave is input from the reflected wave threshold determination element 16 into the reflected wave phase detector 17, the reflected wave phase detector 17 calculates the phase of the reflected wave based on the time of receiving the reflected wave. The reflected wave phase detector 17 outputs the phase of the phase of the reflected wave to the phase corrector 18. The phase of the reflected wave is input from the reflected wave phase detector 17 to the phase corrector 18, and the phase correction amount from the phase correction amount calculator 15 is input to the phase corrector 18. The phase corrector 18 compensates (i.e., corrects) the phase of the reflected wave based on the phase correction amount. The phase corrector 18 outputs the corrected phase of the reflected wave to the direction detector 19.

When the corrected phase of the reflected wave is input from the phase corrector 18 to the direction detector 19, the direction detector 19 detects the direction of the object based on a phase difference between the phase of the reflection wave detected by the receiving microphone 5a and the phase f the reflection wave detected by the receiving microphone 5b, the distance between the receiving microphones 5a, 5b, and the wavelength of the transmitting wave at the sound speed. The direction detector 19 outputs the direction of the object to the position detector 21. In this case, the direction of the object is shown as a shift from a direction perpendicular to a line segment between the receiving microphones 5a, 5b.

When the transmitting time of the transmitting wave is input from the transmitting wave generator 2 to the distance detector 20, and the receiving time of the reflected wave is input from the reflected wave threshold determination element 16 to the distance detector 20, the distance detector 20 calculates the distance to the object based on the sound speed calculated by the sound speed estimating element 14 and the time difference between the transmitting time and the receiving time. The distance detector 20 outputs the distance of the object to the position detector 21.

When the direction of the object is input from the direction detector 19 to the position detector 21, and the distance of the object is input from the distance detector 20 to the position detector 21, the position detector 21 calculates the position of the object based on the direction and the distance of the object. Then, the position detector 21 outputs the position of the object.

Figure 2A:
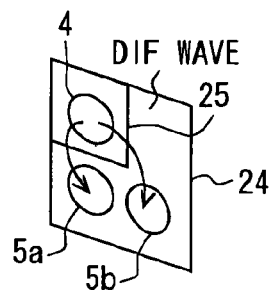
FIG. 2A is a diagram showing a diffraction wave.
Figure 2B:
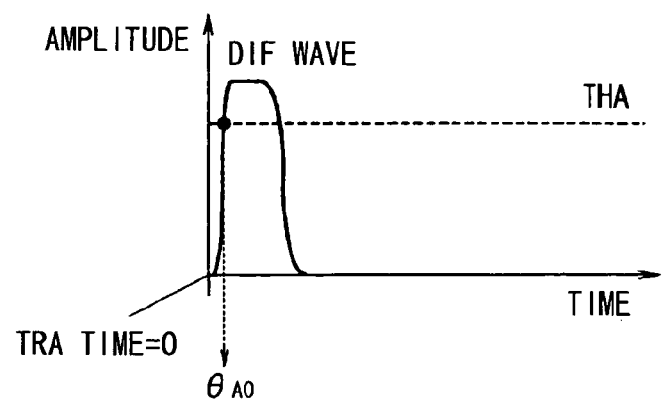
FIG. 2B is a graph showing a waveform of the diffraction wave in a receiving microphone $5a$ and FIG. 2C is a graph showing a waveform of the diffraction wave in a receiving microphone $5b$.
Figure 2C:
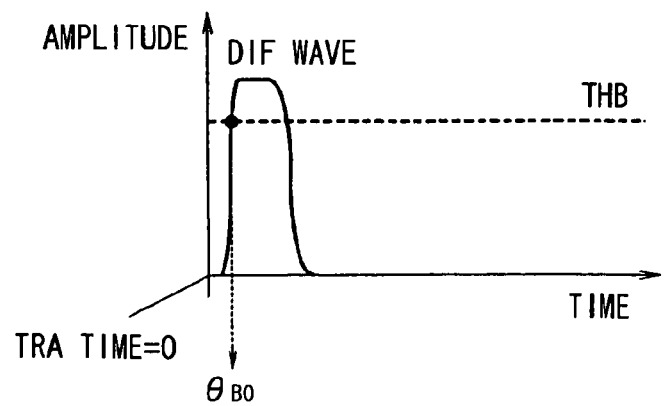

The function of the above ultrasonic device will be explained as follows. First, a process for storing the initial phase of the diffraction wave is performed before the ultrasonic device is shipped. The process will be explained. The ultrasonic device 1 for detecting the position of the object transmits the transmitting wave from the transmitting microphone 4. The transmitting wave is generated in the transmitting wave generator under a reference temperature such as 20° C. As shown in FIG. 2A, a part of the transmitting wave from the transmitting microphone 4 is diffracted so that the diffraction wave directly penetrates the receiving microphones 5a, 5b. The diffraction wave phase calculator 12 detects the phase of the diffraction wave. The initial phase of the diffraction wave is stored in the phase correction amount calculator 15. Then, the ultrasonic device 1, in which the initial phase of the diffraction wave is stored, is shipped as a product. Here, the reference temperature is defined as $T_0$ (° C.), and the sound speed under the reference temperature is defined as $C_0$ (m/s). The sound speed is calculated as follows.

$$C_0=331.5+0.61 \times T_0.$$

Figure 3:
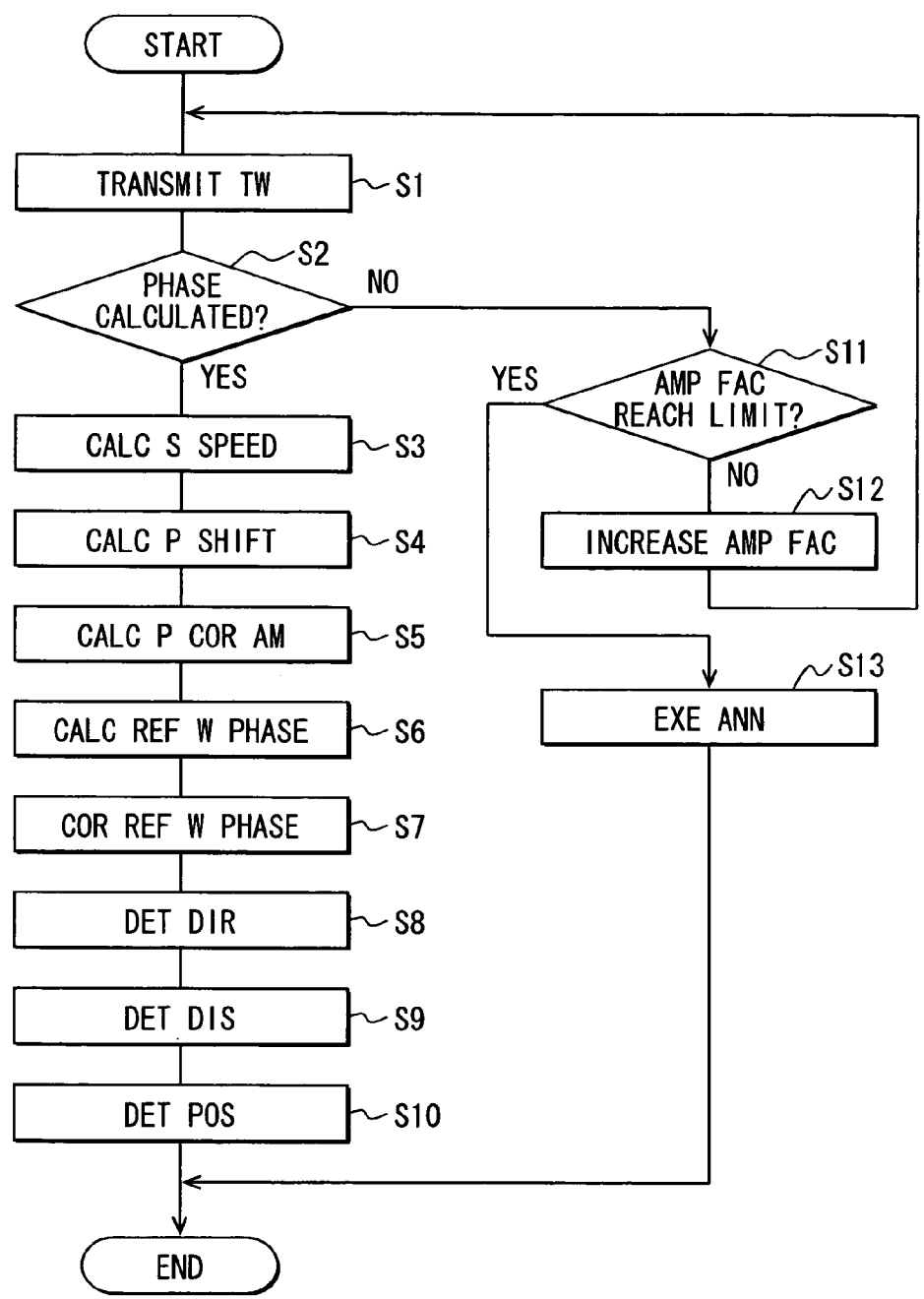
FIG. 3 is a flowchart showing a method of detecting a position of the object.
Figure 4A:
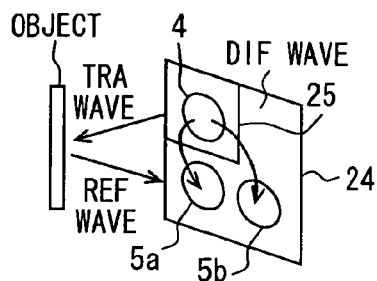
FIG. 4A is a diagram showing a reflection wave and the diffraction wave.
Figure 4B:
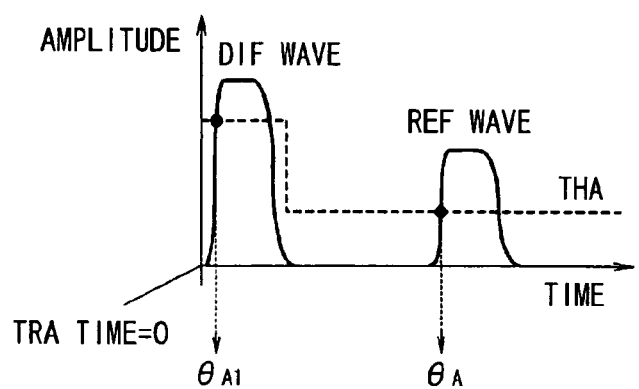
FIG. 4B is a graph showing a waveform of the reflection wave and diffraction wave in the receiving microphone $5a$.
Figure 4C:
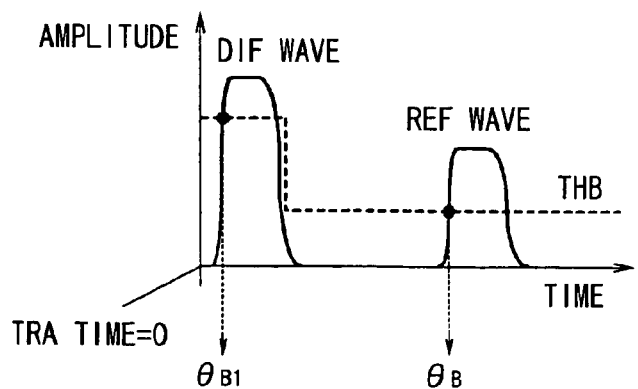
FIG. 4C is a graph showing a waveform of the reflection wave and the diffraction wave in the receiving microphone $5b$.

Next, after the ultrasonic device 1 is shipped, the device 1 detects the position of the object as follows. FIG. 3 shows a flowchart of a process for detecting the position of the object. In Step S1, the ultrasonic device 1 transmits the transmitting wave from the transmitting microphone 4. The transmitting wave is generated in the transmitting wave generator 2. Then, in Step S2, the ultrasonic device 1 determines whether the amplitude of the receiving wave corresponding to the diffraction wave is equal to or larger than the threshold amplitude. A part of the transmitting wave from the transmitting microphone 4 is diffracted so that the diffraction wave directly penetrates in the receiving microphones 5a, 5b. Further, the ultrasonic device 1 determines whether the phase of the diffraction wave is calculated in the diffraction wave phase calculator 12.

When the ultrasonic device 1 determines that the amplitude of the receiving wave corresponding to the diffraction wave is equal to or larger than the threshold amplitude, and that the phase of the diffraction wave is calculated in the diffraction wave phase calculator 12 (i.e., the answer in Step S2 is "YES"), it goes to Step S3. In Step S3, the ultrasonic device 1 estimates the sound speed at present moment with using the sound speed estimating element 14. Specifically, the device 1 estimates the sound speed according to the following formula.

$$C1=331.5+0.61 \times T1.$$

Here, the temperature at present moment is defined as $T1$ (° C.), and the sound speed at present moment is defined as $C1$ (m/s).

Then, the device 1 calculates the phase shift caused by the sound speed change with using the phase correction amount calculator 15 in Step S4. Specifically, the device 1 defines the distance between the transmitting microphone 4 and the receiving microphone 5a as $d_A$, and the distance between the transmitting microphone 4 and the receiving microphone 5b as $d_B$. The frequency of the transmitting wave is defined as f, the phase shift in the receiving microphone 5a caused by the sound speed change is defined as $\Delta\theta_{A0}$, and the phase shift in the receiving microphone 5b caused by the sound speed change is defined as $\Delta\theta_{B0}$. Each phase shift of $\Delta\theta_{A0}$ and $\Delta\theta_{B0}$ is calculated according to the following formula.

$$\Delta\theta_{A0}=\{d_A/(C_1/f)-d_A/(C_0/f)\} \times 2pai.$$

$$\Delta\theta_{B0}=\{d_B/(C_1/f)-d_B/(C_0/f)\} \times 2pai.$$

The device 1 calculates the phase correction amount based on the initial phase of the diffraction wave stored in the initial phase memory 13, the calculated phase shift caused by the sound speed change, and the phase of the diffraction wave calculated in the diffraction wave phase calculator 12 with using the phase correction amount calculator 15 in Step S5. Specifically, the phase of the diffraction wave in the receiving microphone 5a calculated in the diffraction wave phase calculator 12 is defined as $\theta_{A1}$, and the initial phase of the diffraction wave in the receiving microphone 5a stored in the initial phase memory 13 is defined as $\theta_{A0}$. The phase of the diffraction wave calculated in the receiving microphone 5b in the diffraction wave phase calculator 12 is defined as $\theta_{B1}$, and the initial phase of the diffraction wave in the receiving microphone 5b stored in the initial phase memory 13 is defined as $\theta_{B0}$. The phase correction amount of the receiving microphone 5a is defined as $\Delta\theta_A$, and the phase correction amount of the receiving microphone 5b is defined as $\Delta\theta_B$. Each phase correction amount of $\Delta\theta_A$ and $\Delta\theta_B$ is calculated according to the following formula.

$$\Delta\theta_A=\theta_{A1}-\theta_{A0}-\Delta\theta_{A0}=\theta_{A1}-\theta_{A0}-\{d_A(C_1/f)-d_A/(C_0/f)\} \times 2pai$$

$$\Delta\theta_B=\theta_{B1}-\theta_{B0}-\Delta\theta_{B0}=\theta_{B1}-\theta_{B0}-\{d_B(C_1/f)-d_B/(C_0/f)\} \times 2pai$$

The device 1 calculates the phase of the reflection wave with using the reflected wave phase detector 17 in Step S6, the reflection wave being reflected on the object and received by the receiving microphones 5a, 5b. In Step S7, the calculated phase of the reflection wave is corrected based on the phase correction amount in Step S7. Specifically, the phase of the reflection wave in the receiving microphone 5a before correction is defined as $\theta_A$, and the phase of the reflection wave in the receiving microphone 5b before correction is defined as $\theta_B$. The phase of the reflection wave in the receiving microphone 5a after correction is defined as $\theta'_A$, and the phase of the reflection wave in the receiving microphone 5b after correction is defined as $\theta'_B$. Each phase of $\theta'_A$ and $\theta'_B$ after correction is calculated as follows.

$$\theta'_A=\theta_A-\Delta\theta_A$$

$$\theta'_B=\theta_B-\Delta\theta_B$$

Then, the device 1 detects the direction to the object in Step S8 based on the phase difference between the corrected phase $\theta'_A$ of the reflection wave in the receiving microphone 5a and the corrected phase $\theta'_B$ of the reflection wave in the receiving microphone 5b, the distance between the receiving microphones 5a, 5b, and the wavelength of the transmitting wave corresponding to the sound speed estimated by the sound speed estimating element 14. Specifically, the distance between the receiving microphones 5a, 5b is defined as D, the wavelength of the transmitting wave is defined as $\lambda_1$, and the direction to the object is defined as $\phi$. The direction $\phi$ is calculated as follows.

$$\phi=\arcsin\{\lambda_1 \times (\theta'_B-\theta'_A)/(2pai \times D)\}$$

$$\lambda_1=C_1/f$$

The device 1 detects the distance to the object with using the distance detector 20 in Step S9 based on the time difference between the transmitting time of the transmitting wave and the receiving time of the reflection wave and the sound speed estimated by the sound speed estimating element 14. The device 1 detects the position of the object in Step S10 based on the direction and the distance of the object.

When the device 1 determines that the amplitude of the receiving signal corresponding to the diffraction wave penetrating to the receiving microphones 5a, 5b is smaller than the threshold amplitude, and that the phase of the diffraction wave is not calculated by the diffraction wave phase calculator 12, it goes to Step S11. Specifically, the determination in Step S2 is "NO," it goes to Step S11. In Step S11, the device 1 determines whether the amplification factor at the present moment reaches the upper limit, which is preliminary set.

When the device 1 determines that the amplification factor at the present moment does not reach the upper limit, i.e., when the determination in Step S11 is "NO," it goes to Step S12. In Step S12, the device increases the amplification factor at the present moment in a stepwise manner according to a predetermined increase rate. Then, it returns to Step S1, and the process in FIG. 3 is repeated. When the device 1 determines that the amplification factor at the present moment reaches the upper limit, i.e., when the determination in Step S11 is "YES," it goes to Step S13. In Step S13, the device controls the annunciation element 26 to perform annunciation. The device ends the process in FIG. 3 without detecting the direction to the object.

Figure 5:
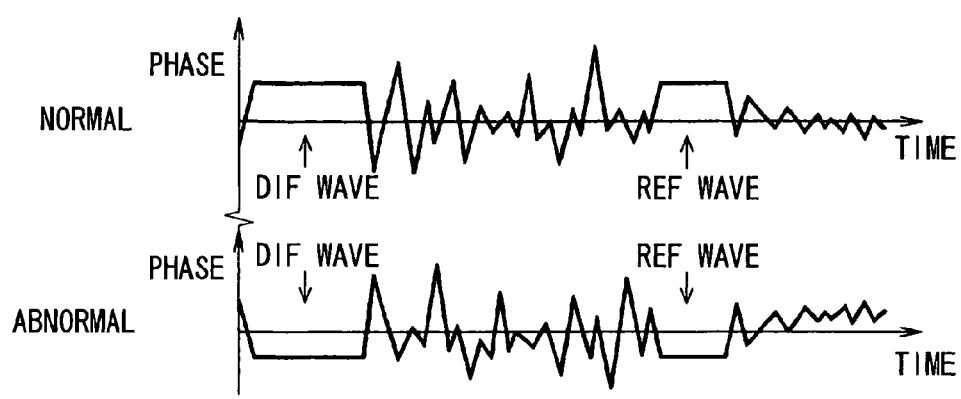
FIG. 5 is a graph showing a phase relationship between the diffraction wave and the reflection wave.
Figure 6:
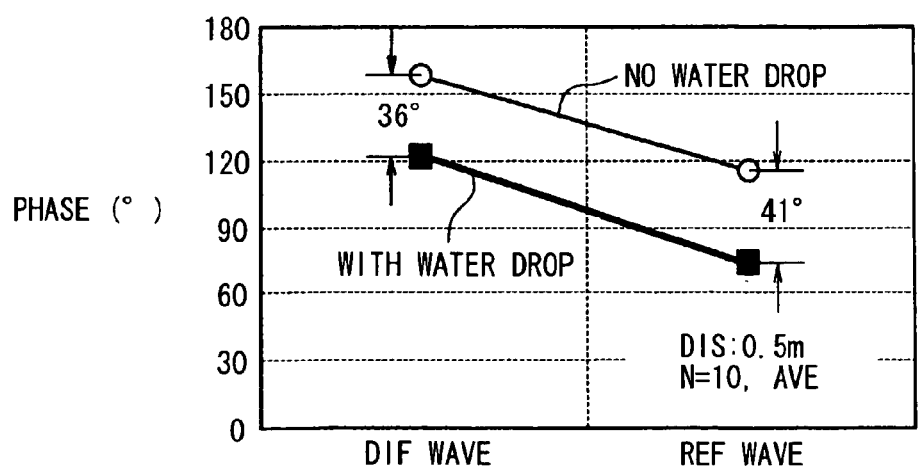
FIG. 6 is a graph showing a result of proving experiment.

As shown in FIGS. 5 and 6, the device 1 corrects the phase shift of the reflection wave based on the phase shift of the diffraction wave even when a phase relationship between the diffraction wave provided by diffracting a part of the transmitting wave and penetrating into the receiving microphones 5a, 5b and the reflection wave reflected on the object and received by the receiving microphones 5a, 5b is in a normal manner or in an abnormal manner. Here, when the phase relationship is normal, no foreign attachment adheres to the device 1. When the phase relationship is abnormal, foreign attachment adheres to the device 1. In FIG. 6, the distance between the device 1 and the object such as a ball having a diameter of 60 millimeters is 0.5 meters. Further, under temperature constant condition, the phase of the reflection wave and the diffraction wave detected by the receiving microphone 5a is detected. This detection in a case where one water drop is attached to the receiving microphone 5a is performed ten times, and the detection in a case where no water drop is attached to the receiving microphone 5a is also performed ten times. Thus, the average phase of the reflection wave and the diffraction wave is shown in FIG. 6.

Although the device 1 includes two receiving microphones 5a, 5b, the device 1 may include three receiving microphones, which are arranged in a triangle manner. Alternatively, the device 1 may include four microphones, which are arranged in a lattice manner. The phase difference between receiving microphones arranged in a horizontal direction is calculated. Based on the phase difference, the distance between the receiving microphones arranged in the horizontal direction, and the wavelength, the direction to the object in the horizontal direction is detected. Further, the phase difference between receiving microphones arranged in a vertical direction is calculated. Based on the phase difference, the distance between the receiving microphones arranged in the vertical direction, and the wavelength, the direction to the object in the vertical direction is detected. Thus, the three-dimensional position of the object is detected.

The device 1 calculates the phase of the diffraction wave provided by diffracting a part of the transmitting wave and directly penetrating into the receiving microphones 5a, 5b. The device 1 memorizes the phase of the diffraction wave under the reference temperature as the initial phase. The device 1 calculates the phase correction amount based on the initial phase and the sound speed at the present time. The device 1 detects the direction to the object based on the phase difference between the corrected phase of the reflection wave received by the receiving microphone 5a and the corrected phase of the reflection wave received by the receiving microphone 5b, the distance between the receiving microphones 5a, 5b, and the wavelength of the transmitting wave corresponding to the sound speed at the present moment.

Thus, when a foreign matter is attached to the receiving microphones 5a, 5b, or when variation of temperature characteristics on a receiving side in the device 1 is generated, the phase shift may be generated. Even when the phase shift is generated, the phase shift of the reflection wave is corrected since the phase correction amount is calculated based on the phase shift of the diffraction wave. Thus, the detection accuracy of the direction to the object is improved.

The phase correction amount may be calculated in every time when the transmitting wave is transmitted. Alternatively, the phase correction amount may be calculated only at a time just after the device 1 is activated, for example, just after a driver of a vehicle shifts a gear to reverse when the device 1 is an in-vehicle ultrasonic sonar and the sonar is activated in a case where the driver reverses the vehicle.

A time zone in which the receiving signal from the LPF 10a-10d is output to the diffraction wave threshold determination element 11 may be separated from a time zone in which the receiving signal from the LPF 10a-10d is output to the reflected wave threshold determination element 16 so that two time zones are selectively switched from each other.

In the above embodiment, the annunciation element 26 performs annunciation when the device 1 determines that the amplification factor of the signal amplifier 7a, 7b at the present moment reaches the upper limitation. Alternatively, the annunciation element 26 may perform annunciation when the device 1 determines that the diffraction wave phase calculator 12 does not calculate the phase of the diffraction wave even if the amplification factor of the signal amplifier 7a, 7b at the present moment does not reach the upper limitation.

The sound speed estimating element 14 as a temperature sensor may be a platinum resistor temperature sensor, a thermistor, a surface acoustic wave device, a sensor for detecting temperature with difference of temperature characteristics between two different resistors, or a sensor for detecting temperature with temperature characteristics of a diode.

The phase correction amount calculator 15 estimates the phase shift caused by the sound speed change based on the sound speed detected by the sound speed estimating element 14, the distance $d_A$, $d_B$ between the transmitting microphone 4 and the receiving microphones 5a, 5b, and the frequency f of the transmitting wave. Alternatively, a relationship between the sound speed and the phase shift may be preliminary stored, and the phase shift corresponding to the sound speed detected by the sound speed estimating element 14 may be estimated based on the stored relationship.

The above disclosure has the following aspects.

According to an aspect of the present disclosure, a ultrasonic device for detecting a direction to an object includes: a transmitting element for transmitting a transmission ultrasonic wave; first and second receiving elements for receiving a reflection wave, which is reflected on the object, wherein the first and second receiving elements are arranged in an array manner; a diffraction wave phase detector for detecting a phase of a diffraction wave penetrating into each of the first and second receiving elements, wherein the diffraction wave is generated in such a manner that a part of the transmission wave is diffracted and penetrates into the first and second receiving elements; an initial phase memory for storing the phase of the diffraction wave as an initial phase under a predetermined sound speed; a sound speed detector for detecting a sound speed; a phase correction amount calculator for calculating a phase shift of the diffraction wave received by each of the first and second receiving elements, wherein the phase shift is caused by a sound speed change, and for calculating a phase correction amount in each of the first and second receiving elements based on the phase of the diffraction wave, the initial phase of the diffraction wave and the phase shift of the diffraction wave; a phase correction element for correcting a phase of the reflection wave received by each of the first and second receiving elements based on the phase correction amount; and a direction detector for detecting the direction to the object based on a difference between a corrected phase of the reflection wave received by the first receiving element and a corrected phase of the reflection wave received by the second receiving element, a distance between the first and second receiving elements, and a wavelength of the transmission ultrasonic wave corresponding to the sound speed.

Since a phase relationship between the diffraction wave and the reflection wave is maintained, the phase of the reflection wave can be corrected in view of the phase correction amount, which is calculated based on the phase shift of the diffraction wave. Thus, the phase shift of the reflection wave is corrected. Accordingly, even if a foreign matter is attached to the receiving element, or temperature characteristics of a receiving side are varied, the direction to the object is detected with high accuracy.

Alternatively, the sound speed detector may include a temperature sensor for detecting temperature, and the sound speed detector detects the sound speed based on the temperature. In this case, the sound speed can be estimated with high accuracy, so that the detection accuracy of the direction to the object is improved.

Alternatively, the sound speed detector may detect the sound speed based on a difference between a transmission time of the transmission wave and a reception time of the diffraction wave, and the distance between the first and second receiving elements. The transmitting element transmits the transmission wave at the transmission time, and each of the first and second receiving elements receives the diffraction wave at the reception time. Without using a temperature detector, the sound speed can be estimated with a numerical formula. Thus, the structure of the device is simplified.

Alternatively, the phase correction amount calculator may calculate the phase shift of the diffraction wave received by each of the first and second receiving elements based on the sound speed, a distance between the transmitting element and each of the first and second receiving elements, and a frequency of the transmission wave. Thus, the phase shift caused by the sound speed change can be estimated with high accuracy.

Alternatively, the ultrasonic device may further include: a signal amplifier. The signal amplifier amplifies a receiving signal corresponding to the diffraction wave and another receiving signal corresponding to the reflection wave, the diffraction wave and the reflection wave being received by each of the first and second receiving elements, when the diffraction wave phase detector does not detect the phase of the diffraction wave. When the receiving signal intensity of the diffraction wave is not sufficient so that the phase of the diffraction wave cannot be calculated, the receiving signal of the diffraction wave and the receiving signal of the reflection wave are amplified, so that the phase shift of the diffraction wave can be corrected appropriately. Thus, the phase shift of the reflection wave is also corrected appropriately.

Alternatively, the ultrasonic device may further include: an annunciation element for performing annunciation when diffraction wave phase detector does not detect the phase of the diffraction wave. In this case, when the receiving signal intensity of the diffraction wave is not sufficient so that the phase of the diffraction wave cannot be calculated, some failure such as attachment of a foreign matter on the receiving element is informed to an user.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A ultrasonic device for detecting a direction to an object comprising:
    a transmitting element for transmitting a transmission ultrasonic wave;
    first and second receiving elements for receiving a reflection wave, which is reflected on the object, wherein the first and second receiving elements are arranged in an array manner;
    a diffraction wave phase detector for detecting a phase of a diffraction wave penetrating into each of the first and second receiving elements, wherein the diffraction wave is generated in such a manner that a part of the transmission wave is diffracted and penetrates into the first and second receiving elements;
    an initial phase memory for storing the phase of the diffraction wave as an initial phase under a predetermined sound speed;
    a sound speed detector for detecting a sound speed;
    a phase correction amount calculator for calculating a phase shift of the diffraction wave received by each of the first and second receiving elements, wherein the phase shift is caused by a sound speed change, and for calculating a phase correction amount in each of the first and second receiving elements based on the phase of the diffraction wave, the initial phase of the diffraction wave and the phase shift of the diffraction wave;
    a phase correction element for correcting a phase of the reflection wave received by each of the first and second receiving elements based on the phase correction amount; and
    a direction detector for detecting the direction to the object based on a difference between a corrected phase of the reflection wave received by the first receiving element and a corrected phase of the reflection wave received by the second receiving element, a distance between the first and second receiving elements, and a wavelength of the transmission ultrasonic wave corresponding to the sound speed.

2. The ultrasonic device according to claim 1,
    wherein the sound speed detector includes a temperature sensor for detecting temperature, and
    wherein the sound speed detector detects the sound speed based on the temperature.

3. The ultrasonic device according to claim 1,
    wherein the sound speed detector detects the sound speed based on a difference between a transmission time of the transmission wave and a reception time of the diffraction wave, and the distance between the first and second receiving elements,
    wherein the transmitting element transmits the transmission wave at the transmission time, and
    wherein each of the first and second receiving elements receives the diffraction wave at the reception time.

4. The ultrasonic device according to claim 1,
    wherein the phase correction amount calculator calculates the phase shift of the diffraction wave received by each of the first and second receiving elements based on the sound speed, a distance between the transmitting element and each of the first and second receiving elements, and a frequency of the transmission wave.

5. The ultrasonic device according to claim 1, further comprising:
    a signal amplifier,
    wherein the signal amplifier amplifies a receiving signal corresponding to the diffraction wave and another receiving signal corresponding to the reflection wave, the diffraction wave and the reflection wave being received by each of the first and second receiving elements, when the diffraction wave phase detector does not detect the phase of the diffraction wave.

6. The ultrasonic device according to claim 1, further comprising:

an annunciation element for performing annunciation when diffraction wave phase detector does not detect the phase of the diffraction wave.

* * * * *